United States Patent [19]

Miser

[11] Patent Number: 4,596,395
[45] Date of Patent: Jun. 24, 1986

[54] DUAL MATERIAL LIP-TYPE SEAL
[75] Inventor: H. T. Miser, Missouri City, Tex.
[73] Assignee: Utex Industries, Inc., Houston, Tex.
[21] Appl. No.: 670,762
[22] Filed: Nov. 13, 1984
[51] Int. Cl.$^4$ ............................................. F16J 15/18
[52] U.S. Cl. .................................... 277/123; 277/125; 277/188 R; 277/189
[58] Field of Search ........... 277/123, 124, 125, 188 R, 277/188 A, 189, 190

[56] References Cited

U.S. PATENT DOCUMENTS

| | | | |
|---|---|---|---|
| 3,397,893 | 8/1968 | Kampert | 277/125 |
| 3,655,207 | 4/1972 | Schettler | 277/125 |
| 3,719,366 | 3/1973 | Pippert . | |
| 3,801,112 | 4/1974 | Dumazet | 277/190 |
| 4,066,269 | 1/1978 | Linne . | |
| 4,081,185 | 3/1978 | Lane . | |
| 4,125,266 | 11/1978 | Schonherr et al. . | |
| 4,149,566 | 4/1979 | Stowe . | |
| 4,166,627 | 9/1979 | Bainard et al. . | |
| 4,214,629 | 7/1980 | Upton | 271/123 |
| 4,239,243 | 12/1980 | Bainard et al. . | |
| 4,261,583 | 4/1981 | De Fries et al. | 277/189 |
| 4,268,040 | 5/1981 | Bainard et al. . | |
| 4,406,469 | 9/1983 | Allison | 277/123 |
| 4,433,847 | 2/1984 | Weinberg | 277/125 |
| 4,436,316 | 3/1984 | Karr | 277/124 |
| 4,483,543 | 11/1984 | Fisher | 277/188 R |

FOREIGN PATENT DOCUMENTS 2022770A 12/1979 United Kingdom .

Primary Examiner—Robert I. Smith
Attorney, Agent, or Firm—Browning, Bushman, Zamecki & Anderson

[57] ABSTRACT

An annular seal of the cup packing type having a first annular section formed from a generally non-flexible, generally non-resilient material and having an annular, radially projecting flange portion and a first axially extending skirt portion, and a second annular section having a second axially extending annular skirt portion defining a sealing surface and comprised of a generally flexible, generally resilient material, the second section being generally axially displaced from the flange portion, said first and second skirt portions being adjoined, preferably by bonding to one another.

9 Claims, 4 Drawing Figures

DUAL MATERIAL LIP-TYPE SEAL

BACKGROUND OF THE INVENTION

The present invention relates to seal members and especially to cup seals and packings used in hydraulic and pneumatic application to seal between relatively movable members.

Cup-type seals and packings have been in existence for many years and are commonly used to seal in cylinders or working barrels, the cup seals being carried by the moving element such as a pump rod or the like. For example, such seals are employed extensively in downhole pumps to seal between the pump rod and the barrel of the pump. In such conventional cup seals, the sealing portion in contact with the cylinder wall of the cup seal is generally on the OD of the seal. There are, however, other applications utilizing modified cup seals and packings wherein sealing occurs on an ID surface of the seal such as, for example, where the sealing surface formed by the lip of the cup seal contacts a moving rods, shaft, etc. in sealing engagement.

Generally speaking, in a typical sealing arrangement, a plurality of cup seals are assembled between metal spacers in a stacked array. To effect proper sealing, the stacked array is mechanically compressed along its axial dimension. In the case of a stacked array using a cup seal with an OD sealing lip, the cup seal has a radially inwardly extending clamping flange forming part of the "heel portion" of the seal. The axial compression of the stacked array occurs by mechanical compression applied to the axially facing surfaces of the radially inward flange. This compressive force coupled with the fluid pressure tends to distort the cup seal in a radially outer direction in the area adjacent the heel portion. Excessive forces can result in a high friction or high wear area which can result in premature cup failure. To overcome this problem, cup seals have been made of various materials designed to resist excessive distortion and premature wearing. Thus, cup seals have been constructed of all cotton fabric, cotton fabric and nylon combination, all with suitable elastomeric binders, as well as from nylon, leather, etc. These approaches have not proven altogether satisfactory in solving the problem described above in connection with excessive wear spots.

It is known to provide various types of seals and packings of dual material construction. British Pat. No. 2,022,770 discloses a pig cup for pipeline pigs, the pig cup having a skirt portion which is made of a relatively soft elastomer and which is arranged to sealingly engage a pipe wall in use, the skirt portion being carried by a body portion which is made of a relatively hard elastomer.

U.S. Pat. No. 4,066,269 to Linne discloses a dual material seal member having a support section formed of a high modulus material and a sealing section formed of an elastomeric material, the two materials being bonded directly together without the use of an adhesive therebetween.

SUMMARY OF THE INVENTION

It is therefore an object of the invention to provide an improved cup seal.

Another object of the present invention is to provide a dual material construction cup seal with improved wear characteristics.

The above and other objects of the present invention will become apparent from the drawings, the description given herein and the appended claims.

The seal of the present invention is in the form of an annular member having a first annular section formed from a generally non-flexible, non-resilient material and a second annular section defining a sealing surface and comprised of a generally flexible, generally resilient material. The two sections are adjoined, preferably by bonding, to one another. The first section includes an annular radially projecting clamping flange, generally axially displaced from said second section, and a first axially extending skirt portion attached to the flange portion. The second section includes a second axially extending skirt portion, the first and second skirt portions being adjoined to one another.

DETAILED DESCRIPTION OF THE PREFERRED EMBODIMENT

Figure 2:
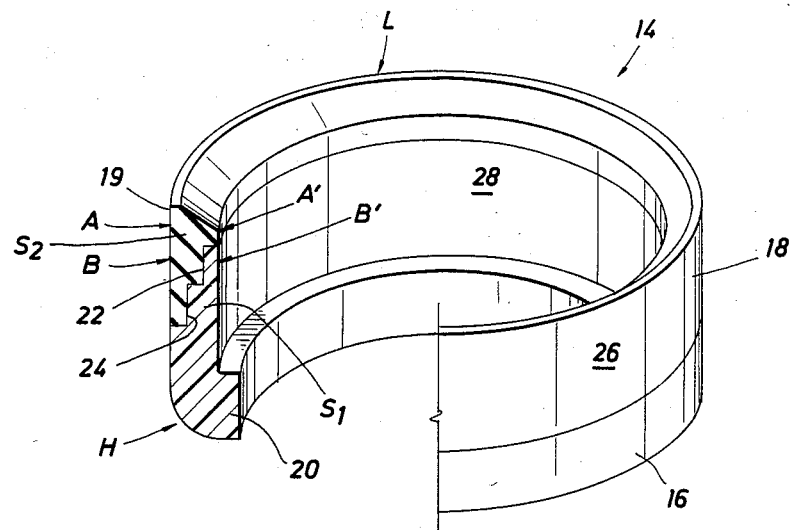
FIG. 2 is a perspective view, partly in section, showing the cup seal of FIG. 1.

Referring first to FIG. 2, the cup seal 14 includes a first annular section 16 and a second annular section 18 which together define a heel portion H and a lip portion L. First annular section 16 is comprised of a generally non-flexible, generally non-resilient material described more fully hereafter. The second annular section 18, on the other hand, is comprised of a generally flexible, generally resilient material, also described more fully hereafter. Sections 16 and 18 are adjoined to one another, preferably by bonding, along their contiguous surfaces. First annular section 16 has a radially inwardly projecting clamping flange 20 forming part of heel H and which is generally axially displaced from second annular section 18. Section 16 also includes an axially extending, annular skirt $S_1$, integral with flange 20 and projecting therefrom. Second annular section 16, which includes an axially extending skirt portion $S_2$, has an annular sealing surface 19 formed on the outer circumferential surface of skirt $S_2$, i.e. on lip L. Skirt $S_1$ of first annular section 16 has a series of steps defining an annularly extending, stepped surface 22. Skirt $S_2$ of second annular section 18 also has a series of steps defining an annularly extending, stepped surface 22. As can be seen, stepped surfaces 22 and 24 have a complementary configuration, annular sections 16 and 18 being adjoined, preferably by bonding, to one another stepped surfaces 22 and 24.

Skirt $S_1$ of first section 16 acts as a reinforcement for the more flexible, more resilient skirt $S_2$ of second section 18, particularly sealing surface 19. In this regard, it can be seen that skirt $S_1$ is disposed radially inward of seal 14 so as to resist radially inward directed forces on sealing surface 19 of skirt $S_2$ which is disposed on the radial outer surface of seal 14.

The widest radial thickness of second annular section 18 occurs distal flange 20 in relation to the narrower radial thicknesses defining stepped surface 24. Thus, it can be seen that the thickest radial thickness A-A' of second section 18 is disposed at one axial end of cup seal 14 and actually extends from the outer surface 26 to the inner surface 28 of the lip L, and is generally equal to the radial thickness B-B' of the overlapped portions of first and second skirt portion $S_1$ and $S_2$, respectively. It will be appreciated that lip L, while generally of uniform radial thickness, may be slightly thicker, i.e. radially outwardly, adjacent the axial end distal heel H.

Figure 1:
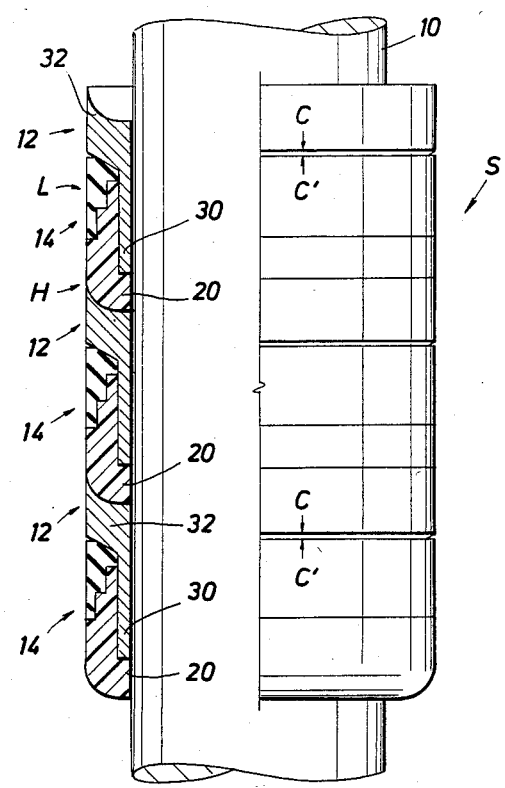
FIG. 1 is an elevational view, partly in section, showing a stacked array of the cup seals of the present invention affixed to a shaft such as a pump rod.

Referring now to FIG. 1, there is shown a stacked array S secured to a pump rod 10 in well known fashion. The stacked array S includes a plurality of axially displaced spacers 12 and a plurality of axially displaced cup seals 14. As can be seen, the cup seals 14 are disposed between successive spacers 12. It will be appreciated that in a full assembly, the array would also include a means to mechanically compress the stacking array along its axial dimension whereby the seals 14 are generally compressed between the spacers 12. Spacers 12 have an axially extending skirt portion 30 and a radially extending flange portion 32. In the stacked array S, the clamping flange 20 of the heel portion H of the seal 14 is compressed between the skirt 30 of a spacer 12 and the flange 32 of the next successive spacer 12. In order to prevent distortion of the lip L of seal 14, spacers 12 are dimensioned such that there is a stand-off or clearance C-C' between the axial end of the lip L and the flange 32 of spacer 12. This of course allows direct engagement of the end of axial skirt 30 with the radial flange 20 of seal 14. It will be readily apparent that if cup seal 14 were made of an elastomeric-like material throughout, the portion of the lip L adjacent the heel H would tend to expand radially outward to such a degree that a high friction area or wear area would be caused generally in a locus determined by the radially outer surface of heel H. This high friction area, particularly if the cup seal were in abrasive conditions, would result in premature cup failure. While this problem can be overcome to some extent by constructing the entire cup seal of a less resilient, more rigid material such as, for example, nylon, the use of such material because of its inherent lack of sufficient resiliency or flexibility reduces the ability of the lip L, and more specifically the sealing surface 19, to effectively seal against the wall of the cylinder in which the rod 10 is moving, particularly at low pressures. Using the cup seal 14 of the present invention, however, the high wear areas adjacent the heel H are reduced without a loss of resiliency of the sealing lip L. This is accomplished by the unique construction of seal 14. Thus, first section 16 which forms the heel H, the skirt $S_1$ and the flange 20 of the seal 14, is made of a generally non-flexible, generally non-resilient material which while possessing sufficient resiliency, does not readily distort adjacent the heel H. On the other hand, second annular section 18, because it is of a generally flexible, generally resilient material, is able to effectively seal against the cylinder wall even at low pressures. It is believed that the skirt $S_1$ acts as a back-up to more resilient skirt $S_2$ and serves to distribute the axial loading imposed on the lip L resulting in more uniform and longer wear without any localized high wear areas occurring along sealing surface 19.

Figure 3:
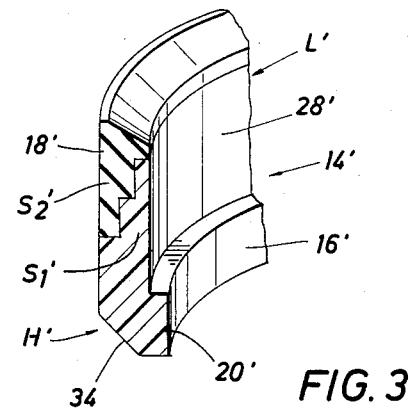
FIG. 3 is a view similar to FIG. 2 showing another embodiment of the cup seal of the present invention.

Referring now to FIG. 3, there is shown a slightly modified embodiment of the seal member shown in FIG. 2, the embodiment shown in FIG. 3 being a beveled-bottom cup seal. Seal member 14' shown in FIG. 3 differs from that shown in FIG. 2 basically in that the heel portion H' of seal member 14' has a beveled surface 34 as opposed to the radiused surface of the heel H of seal member 14 shown in FIG. 1.

Figure 4:
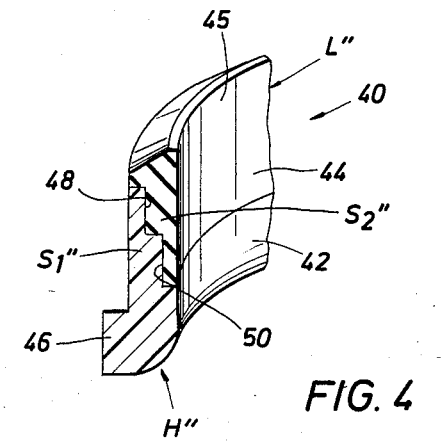
FIG. 4 is a view similar to FIG. 2 showing another embodiment of the cup seal of the present invention.

In FIG. 4 there is shown still another embodiment of the present invention where the lip portion L" is on the ID of the seal member. Referring then to FIG. 4, seal member 40 having a heel portion H" and a lip portion L", includes a first section 42 made of a generally non-flexible, generally non-resilient material and a second section 44 made of a generally resilient, generally flexible material, sections 42 and 44 being bonded together or otherwise adjoined. First section 42 includes a radially outwardly protruding clamping flange 46 which is generally axially spaced from second annular section 44 and is integrally formed with a first axially extending, annular skirt $S_1$". As is the case with the embodiments shown in FIGS. 2 and 3, the first and second skirt portion $S_1$" and $S_2$" have a stepped configuration defining a first stepped surface 48 on first skirt portion $S_1$" and a second stepped surface 50 on second skirt portion $S_2$", surfaces 48 and 50 being bonded together or otherwise adjoined. As is the case with the embodiments of FIGS. 2 and 3, skirt $S_1$" is on the radially opposite side of the seal 40 from the sealing surface 45 formed on skirt $S_2$" of the lip L", i.e. skirt $S_1$" is radially outermost while surface 45 is radially innermost.

Although in the embodiment discussed above, the first and second skirt portions which define the lip L of the seal are shown to have a stepped configuration, it will be appreciated that the invention is not so limited. Thus, the first skirt portion, i.e. the less resilient section, can have any configuration wherein the more resilient second skirt portion is reinforced over a substantial portion of its axial length by the first skirt portion. Thus, it is not necessary that the reinforcing skirt, i.e. the skirt portion of the first body section, extend to the axial end of the seal distal the flange portion. It will also be apparent that the two skirt portions, instead of having a stepped configuration can have complementary tapered configurations defining frustoconical surfaces which are adjoined together, or can simply have an essentially straight configuration defining two generally cylindrical surfaces bonded to one another. It will also be apparent that the relative thickness of the two skirt portions can vary depending upon the use to which the seal is put. Thus, for low pressures and generally clean environments where there is little abrasiveness, the skirt portion of the second body section, i.e. the more resilient part, can be thicker, in the radial dimension, than the reinforcing skirt portion, i.e. the skirt portion of the first annular body section. On the other hand, in environments where high pressures are encountered or where abrasion is a problem, it may well be desirable to have the reinforcing skirt of a greater radial thickness than the more resilient skirt portion of the second annular body section which forms the sealing surface.

The cup seals of the present invention can be made from a variety of materials which can vary quite markedly depending upon the application involved. For example, the first annular section which forms the reinforcing section of the cup seal comprised of the heel, the skirt and the flange can be of heterogeneous or homogeneous construction. The material used in constructing the first section can be made of a thermoplastic material, a thermosetting material, a fabric, fibrous particulate or other such reinforced thermoplastic or thermosetting material, a mixed thermoplastic/thermosetting material or various combinations of the above. The term "thermosetting" as used herein applies to those resins, generally synthetic in nature, which solidify or set on heating and cannot be remelted. Non-limiting examples of such thermosetting resins include phenolics, alkyds, amino resins, polyesters, epoxies, silicones and the like. The term "thermoplastic", as used herein, applies to resins, generally synthetic in nature, that may be softened by heat and then regain their original properties upon cooling. Non-limiting examples of such thermoplastic materials include nylon, polyethylene, polypropylene, cellulose and acrylic resins, polycarbonates and the like. The thermosetting or thermoplastic material can be reinforced with a fibrous material which can be in the form of a cloth or has a chopped or flocked filler. The terms "fabric" or "fibrous material" as used herein refer to any material obtained by weaving or other such techniques wherein the matrix consists of a lattice work or web of thread-like elements. Numerous materials fall into this class such as, for example, cotton, asbestos, fiberglas, nylon, polyester, aramids, linen, rayon, various woven metallics and the like. Furthermore, blends of various materials such as cotton-polyester fabrics, rayon-polyester fabrics, etc. may be employed. Additionally, fillers such as carbon black, clays and other mineral substances and, metallic particulates can be incorporated into the thermosetting or thermoplastic materials.

The second annular section forming the sealing surface of the lip is, as noted above, comprised of a generally flexible, generally resilient material, as compared to the first annular section, which can also be comprised of some of the same materials discussed above with respect to the first annular section. Thus, the second annular section can be formed of certain thermoplastic and/or thermosetting materials such as, for example, polyurethanes, nitrile rubbers, fluoroelastomers, acrylonitrile-butadiene-styrene terpolymers, natural rubber, etc. Such materials can be used alone, in admixture with one another, or in further combination with fillers, such as chopped or flocked fabric or fibrous materials, as that term is used above. This is not intended to mean that the cup seals of the present invention are of homogeneous construction in that the first and annular sections have the same composition or make-up. In all cases, the first section will be generally non-flexible and non-resilient as compared with the second section which is generally flexible and generally resilient. Thus, the relative compositions of the two sections will vary depending upon the intended use of the cup seal. It will be appreciated that in environments which are highly abrasive, the second annular section, while still more flexible and more resilient than the first annular section may be less flexible and less resilient than would be the case if it were made of an elastomeric material such as a rubber. The terms "non-flexible" and "non-resilient" are thus not intended to mean that the material has no resiliency or no flexibility. Rather the terms are intended to mean that the material is not generally considered to be flexible or resilient in nature by those skilled in the art of the manufacture of dynamic seals, packings and the like.

However, the terms are intended to exclude a metallic material such as steel or the like, albeit that the first section may well be comprised of a metallic mesh admixed with a suitable binder which may be thermosetting or thermoplastic in nature to permit some degree of resiliency and flexibility.

It will be understood that various configurations and materials of construction other than those discussed above can be used in the seals of the present invention. Accordingly, the configurations and materials of construction depicted in the drawings and described herein are merely illustrative and not intended in any way to limit the scope of the invention, either with regard as to the type of seal or as to the type of construction employed.

What is claimed is:

1. An annular seal member for sealing between two relatively movable components comprising:
a first annular section formed from a generally non-flexible, generally non-resilient material, said first section having an annular, radially projecting flange portion, and a first, axially extending annular skirt portion projecting from said flange portion and a second annular section having a second axially extending annular skirt portion defining a sealing surface and comprised of a generally flexible, generally resilient material, said first section being adjoining to said second section, said second section being generally axially displaced from said flange portion.

2. The seal member of claim 1 wherein the radial thickness of said second sections varies from a first widest thickness to a second, narrower thickness, said first widest thickness being distal said flange portion in relation to said second thickness.

3. The seal member of claim 1 wherein second skirt portion is generally on the opposite side of said seal member from said flange portion.

4. The seal member of claim 3 wherein said flange portion projects radially inwardly.

5. The seal member of claim 3 wherein said flange portion projects radially outwardly.

6. The seal member of claim 1 wherein said annular flange portion is comprised of said generally non-flexible, generally non-resilient material.

7. The seal member of claim 1 wherein said first and second skirt portions have stepped configurations having at least one step, said stepped configurations defining an annularly extending first stepped surface on said first skirt portion and an annularly extending second stepped surface on said second skirt portion, respectively, said first and second stepped surfaces being adjoined to one another.

8. The seal member of claim 7 wherein said stepped surface are bonded to one another.

9. The seal member of claim 1 wherein said first and second sections are bonded to one another.

* * * * *